No. 847,773. PATENTED MAR. 19, 1907.
W. M. HODGSON.
SAFETY CLUTCH FOR MINE CAGES, LIFTS, HOISTING SKIPS, &c.
APPLICATION FILED JUNE 19, 1905.

4 SHEETS—SHEET 1.

No. 847,773. PATENTED MAR. 19, 1907.
W. M. HODGSON.
SAFETY CLUTCH FOR MINE CAGES, LIFTS, HOISTING SKIPS, &c.
APPLICATION FILED JUNE 19, 1905.

4 SHEETS—SHEET 2.

No. 847,773. PATENTED MAR. 19, 1907.
W. M. HODGSON.
SAFETY CLUTCH FOR MINE CAGES, LIFTS, HOISTING SKIPS, &c.
APPLICATION FILED JUNE 19, 1905.

4 SHEETS—SHEET 3.

No. 847,773. PATENTED MAR. 19, 1907.
W. M. HODGSON.
SAFETY CLUTCH FOR MINE CAGES, LIFTS, HOISTING SKIPS, &c.
APPLICATION FILED JUNE 19, 1905.

4 SHEETS—SHEET 4.

UNITED STATES PATENT OFFICE.

WILLIAM M. HODGSON, OF KIMBERLEY, CAPE COLONY.

SAFETY-CLUTCH FOR MINE CAGES, LIFTS, HOISTING-SKIPS, &c.

No. 847,773.          Specification of Letters Patent.          Patented March 19, 1907.

Application filed June 19, 1906. Serial No. 266,026.

To all whom it may concern:

Be it known that I, WILLIAM MARK HODGSON, a subject of the King of England, residing at Kimberley, in the Cape of Good Hope, South Africa, have invented a certain new and useful Improved Safety-Clutch for Mine Cages, Lifts, Hoisting-Skips, and Similar Apparatus, of which the following is a specification.

The subject of my invention is a device which is designed and invented for the purpose of providing a means whereby the cage of a mine-shaft, a lift-cage, hoisting-skip, or other contrivance of a similar nature shall be instantaneously and automatically supported in the event of the rope, chain, or other suspension breaking, thereby preventing the falling of the cage to which it is fitted and accidents arising from such breakage.

In order that my invention may be more readily understood, reference is made to the accompanying drawings, in which I have shown the application of my invention to a mine-cage.

Like letters indicate corresponding parts in all the figures.

Figure 1:
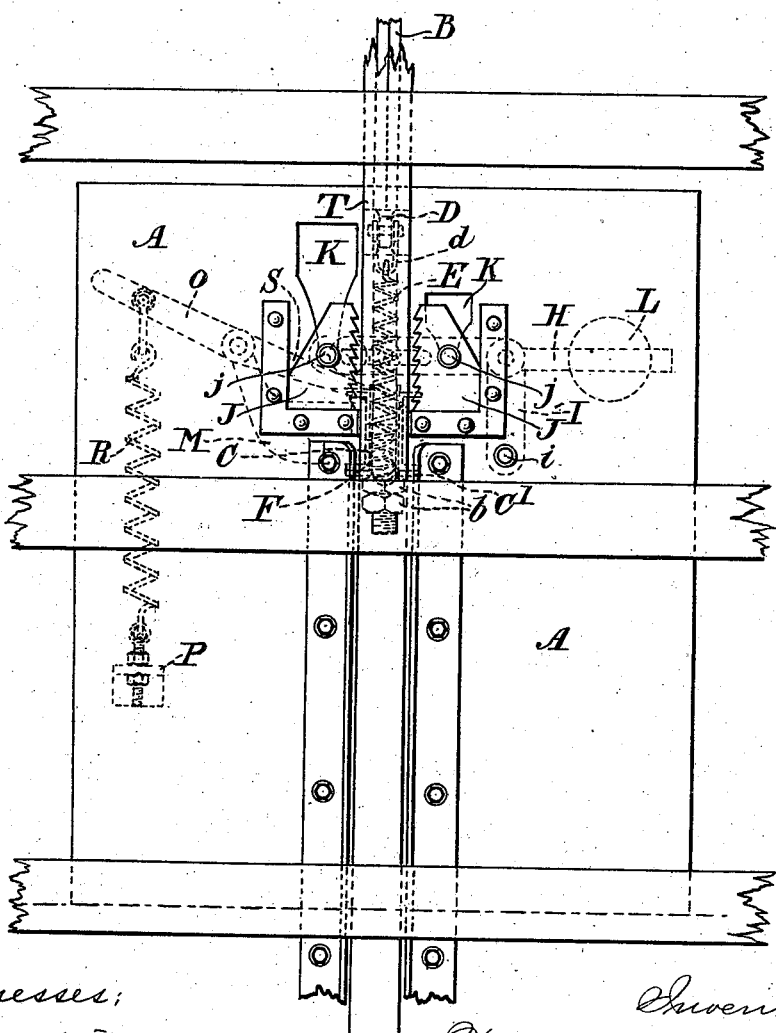
Figure 2:
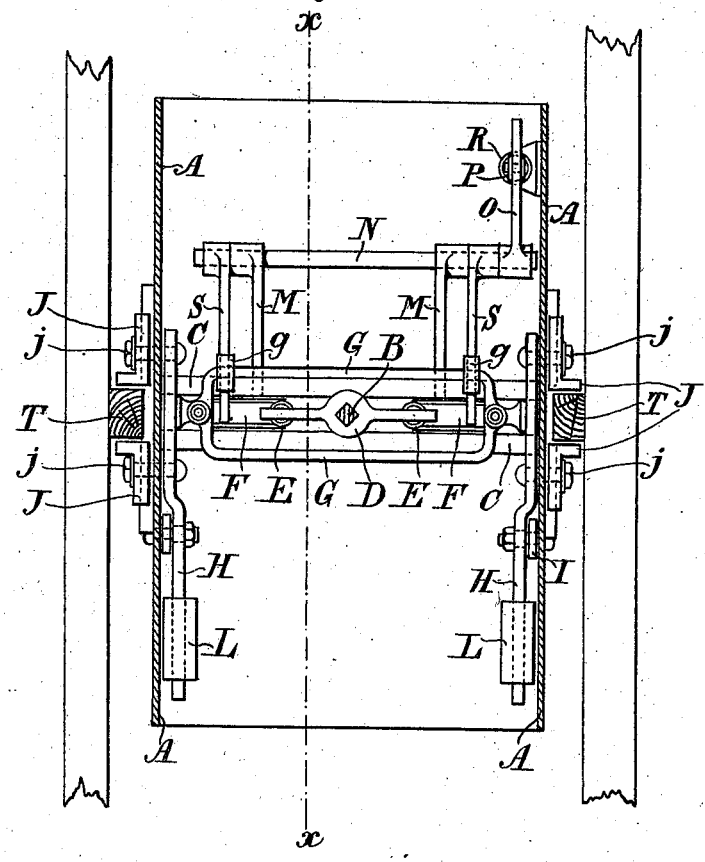
Figure 3:
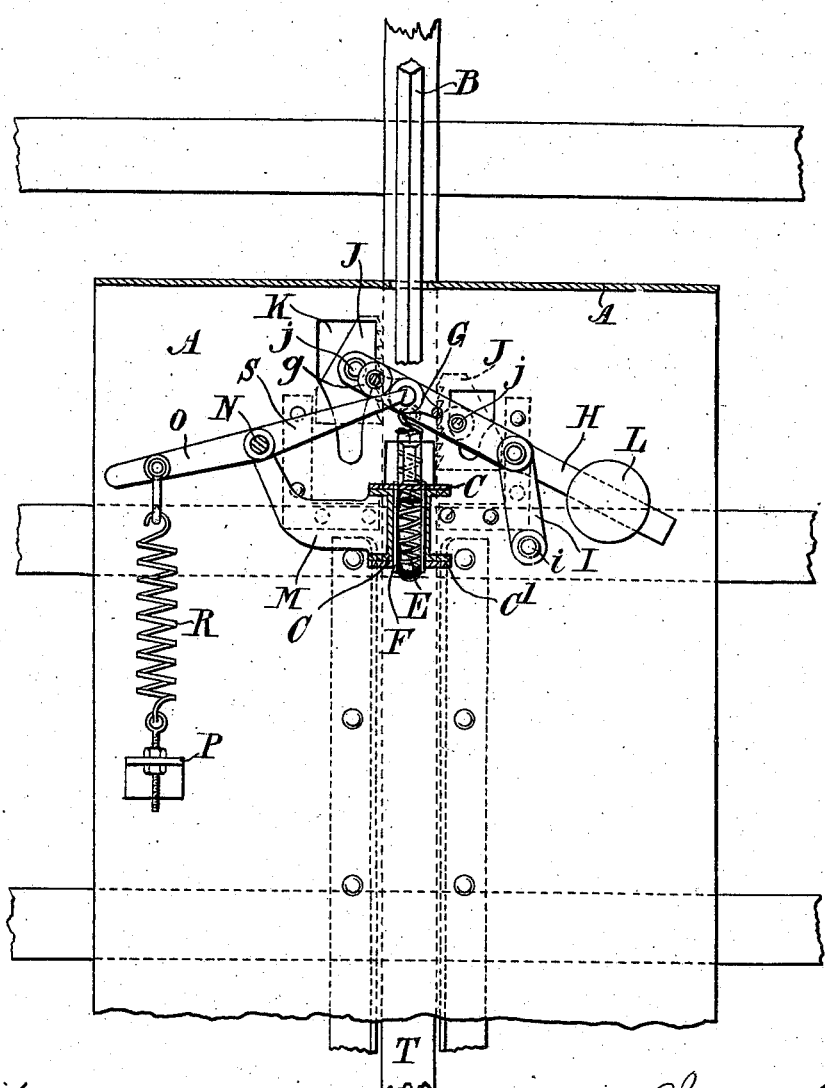
Figure 4:
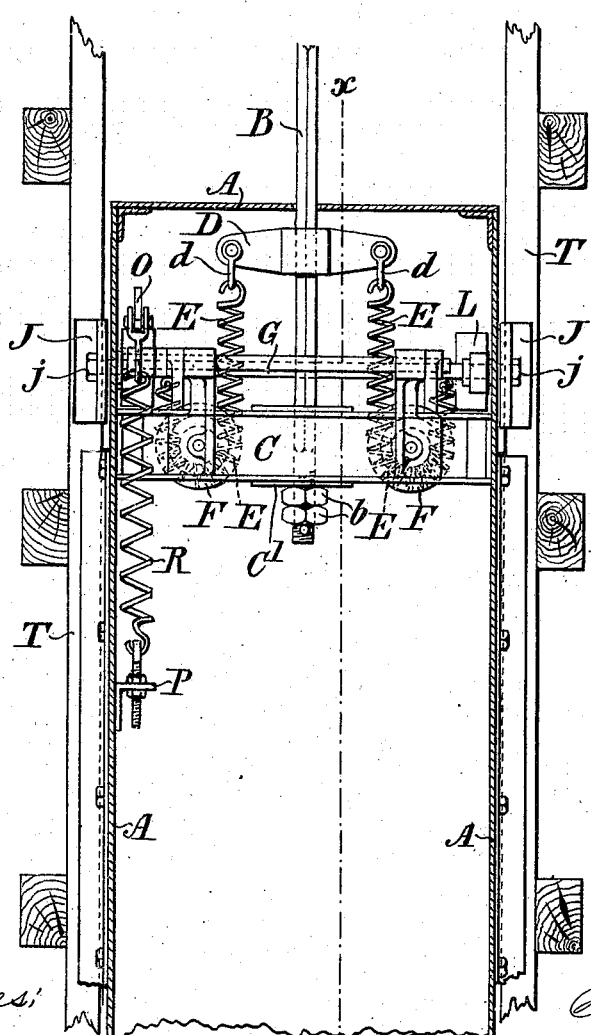

Figure 1 is a side elevation of the oustide of the cage with the device applied thereto. Fig. 2 is a plan of the same, the top of the cage being removed in order that the internal mechanism may be more clearly shown. Fig. 3 is a vertical cross-section of the cage, taken on the line $x\ x$ of Figs. 2 and 4, showing the position of the different component parts after the breaking of the suspending rope or chain; and Fig. 4 is an end view of the cage.

The body of the cage A is suspended by a rope or chain (not shown) which is connected to a draw-bar B by a suitable shackle or other device. The said draw-bar B passes freely through the top of the cage, and the lower end of said bar passes through a slot between two horizontal bars, forming a cross-head C, securely fixed to the body of the cage A. The said horizontal cross-head C normally bears the full weight of the cage and its load and may be of any suitable cross-section.

C' is a plate riveted to the under side of the cross-head.

The lower end of the draw-bar B has lock-nuts $b$, on which the cross-head C rests; but any other suitable device may be employed for the purpose. The draw-bar B has firmly secured thereon a cross member D, the outer ends of which carry shackles $d$, to which are attached one end of spiral springs E. The said springs E pass around grooved pulleys F, mounted on or between the horizontal cross-head C, and are secured at the other ends to a transverse frame G, screws or other means being provided for regulating the tension of said springs.

H H are levers fitted within the cage and fulcrumed by a link I on a stud or pin $i$, fixed in or upon the side of the cage. To the levers H H is rigidly connected the frame G, before referred to, in such a manner that when the said frame is raised in the manner hereinafter described the levers H H are simultaneously lifted with it. The dogs or clutches J on the outside of the cage are hung loosely upon studs $j$ or bolts carried by or secured to the levers H H, the studs or bolts passing through suitably-shaped openings K, provided for the purpose in the sides of the cage. L L are counterbalance-weights on the outer ends of the levers H.

M M are brackets carried by or upon the cross-head C, which brackets support a rod or rocking shaft N. To one end of said shaft N is fixed a rocking arm O, the outer end of which is connected to a bracket P upon the body of the cage by a spiral spring R. S S are also operating-arms keyed or otherwise fastened onto the rocking shaft N, the outer ends of said arms passing under the frame G, which latter rests upon the said arms, anti-friction-rollers $g$ being carried by the frame at the points of contact.

The dogs or clutches J, before referred to, are serrated, as shown, upon their inner or opposing faces, or are provided with other means for gripping the guide-bar T of the shaft. The clutches work within guides on the cage, the said guides being arranged so that the clutches are kept in a vertical position.

The operation of the device is as follows: When the cage is suspended from the rope, the full weight of the same and its load is carried by the draw-bar and by the horizontal cross-head C, the springs E and R being in tension, and the parts being in the position shown in Figs. 1, 2, and 4. Should, however, the rope break, there being no longer an upward strain on the draw-bar, the latter immediately falls and is assisted by the tension on the springs E, and thereby relieves the downward pull of the springs E upon the frame G. The power of the spring R then immediately comes into play and pulls down the rocking arm O and raises in consequence the operating-arms S S, the latter lifting the frame G. The said frame being connected to the levers H H raises them also until the clutches thereon come into contact with the vertical guide-bars of the shaft, which they immediately grip. The cage is thus suspended on the said guide-bars, and while so suspended it cannot be released until the rope or other suspension is reconnected to the draw-bar, and although the cage can be lifted by exterior means it cannot fall or be lowered until the clutches are released.

Of course it is to be understood that modifications of the several parts may be made to suit the apparatus to which it is applied without departing from the spirit of my invention.

What I claim as my invention, and desire to secure by Letters Patent, is—

1. In a safety-clutch for mine-cages and in combination a cage, a vertical guide therefor, suspensory means for the cage, a pair of dogs carried on the cage and arranged one on each side of the guide in close proximity thereto but not in contact therewith, a lever pivotally connected to the cage and operatively connected to the dogs so that when the lever is in horizontal position the dogs are held in normal position clear of the guide and when the lever is rocked the dogs engage the said guide, means to rock said lever and means controlled by the suspensory means to hold the lever in horizontal position while the suspensory means support the weight of the cage.

2. In a safety-clutch for mine-cages and in combination a cage, two vertical guides therefor, two pairs of dogs carried on the cage, and each pair arranged with one dog on either side of a vertical guide and in close proximity thereto but clear thereof, two levers pivotally connected to the cage and operatively connected each lever to one pair of dogs so that when the levers are in horizontal position the dogs are held in normal position clear of the guides but when the levers are rocked each pair of dogs engages its respective guide, means to rock the levers and means common to both levers controlled by the suspensory means to hold the levers in horizontal position when the suspensory means support the cage 3. In a safety-clutch for mine-cages and in combination a cage, a guide therefor, a lever pivotally carried on the cage a pair of dogs pivotally carried on one end of a lever and arranged one on each side of the guide in close proximity thereto but clear thereof when the lever is in horizontal position, a weight on the lever adapted to raise the lever end carrying the dogs and cause the latter to grip the guide and means to normally hold the lever in horizontal position.

4. In a safety-clutch for mine-cages and in combination a cage, a guide therefor, a lever pivotally carried on the cage, a pair of dogs pivotally carried on one end of a lever and arranged one on each side of the guide in close proximity thereto but clear thereof when the lever is in horizontal position, a weight on the lever adapted to raise the lever end carrying the dogs and cause the latter to grip the guide, a second weight-controlled lever adapted to engage the first lever for the purpose described, and means to normally hold the lever in horizontal position.

5. In a safety-clutch for mine-cages and in combination a cage, a guide therefor, a draw-bar adapted to support the cage, a lever pivotally carried on the cage, a pair of dogs pivotally carried on one end of a lever and arranged one on each side of the guide in close proximity thereto but clear thereof when the lever is in horizontal position, a weight on the lever adapted to raise the lever end carrying the dogs and cause the latter to grip the guide and means controlled by the draw-bar to normally hold the lever in horizontal position.

6. In a safety-clutch for mine-cages and in combination, a cage, a draw-bar adapted to support the cage and capable of independent downward movement in relation to the same, a vertical guide for the cage, a lever fulcrumed intermediate its ends on a link pivoted on the car, a weight on one end of the lever, a pair of dogs pivotally carried on the other end of the lever and arranged one on each side of the vertical guide in close proximity thereto but clear thereof when the lever is in a horizontal position, and means controlled by the draw-bar to hold the lever in horizontal position when the draw-bar is supporting the car, and to release the lever to be rocked by the weight when the draw-bar moves downward in relation to the car.

7. In a safety-clutch for mine-cages and in combination, a cage, a draw-bar adapted to support the cage and capable of independent downward movement in relation to the same, vertical guides for the cage, two levers each fulcrumed intermediate its ends on a link pivoted on the car, a weight on one end of each lever, a pair of dogs pivotally carried on the other end of such lever and arranged one on each side of one of the vertical guides in close proximity thereto but clear thereof when the levers are in a horizontal position, and means controlled by the draw-bar to hold the levers in horizontal position when the draw-bar is supporting the car, and to release the levers to be rocked by their weights when the draw-bar moves downward in relation to the car.

8. In a safety-clutch for mine-cages the combination of a cage, a draw-bar adapted to support the cage and capable of independent downward movement in relation to said cage, vertical guides for the cage, dogs carried upon the cage and adapted to engage the guides, levers carrying the dogs and fitted upon opposite walls of the cage, a frame extending across the cage and carried by said levers, means engaging the frame to keep the dogs normally out of engagement with the guides, means for moving the draw-bar downward in relation to the cage when the tension caused by the weight of the latter upon the draw-bar is removed said means simultaneously releasing the frame, operating-arms engaging the frame and moving it upon its release to bring the dogs into engagement with the guides and means for actuating the operating-arms substantially as set forth.

9. In a safety-clutch for mine-cages the combination of a cage a draw-bar adapted to support the cage and capable of independent downward movement in relation to said cage vertical guides for the cage, dogs carried upon the cage and adapted to engage the guides, levers carrying the dogs and fitted upon opposite walls of the cage, a frame extending across the cage and carried by said levers, means for engaging the frame to keep the dogs out of engagement with the guides, means for moving the draw-bar downward in relation to the cage when the tension caused by the weight of the latter upon the draw-bar is removed said means simultaneously releasing the frame, a cross-head secured to the cage, brackets mounted upon a cross-head, a rocking shaft carried by the brackets, operating-arms secured to the rocking shaft the outer ends of said arms engaging the frame, a rocking arm fixed on said rocking shaft and means for actuating the rocking arm, substantially as set forth.

In testimony whereof I have signed my name to this specification in the presence of two subscribing witnesses.

W. M. HODGSON.

Witnesses:
   H. W. MASTERS,
   A. OLIVER.